United States Patent [19]

Bingham

[11] Patent Number: 4,924,763
[45] Date of Patent: May 15, 1990

[54] COMPACT PIZZA OVEN

[75] Inventor: Lynn R. Bingham, Tulsa, Okla.

[73] Assignee: Pizza Hut, Wichita, Kans.

[21] Appl. No.: 258,967

[22] Filed: Oct. 17, 1988

[51] Int. Cl.$^5$ .................... A47J 37/04; F24C 15/32
[52] U.S. Cl. .................... 99/339; 99/331; 99/423; 99/443 R; 126/21 A; 126/41 A; 432/142
[58] Field of Search ............... 99/339, 342, 386, 343, 99/389, 391, 393, 443 R, 443 C, 331; 126/21 A, 41 A; 432/142

[56] References Cited

U.S. PATENT DOCUMENTS

| 2,372,363 | 3/1945 | Dawson | 126/41 A |
|---|---|---|---|
| 2,920,177 | 1/1960 | Brane | 99/423 |
| 3,425,364 | 2/1969 | Martin, Jr. | 432/142 |
| 3,435,754 | 4/1969 | Lohr et al. | 99/443 R |
| 3,552,299 | 1/1971 | Patoka | 99/339 |
| 3,782,892 | 1/1974 | Johnson et al. | 432/142 |
| 3,908,533 | 9/1975 | Fagerstrom et al. | 99/386 |
| 4,154,861 | 5/1979 | Smith | 426/466 |
| 4,167,585 | 9/1979 | Caridis et al. | 426/233 |
| 4,305,329 | 12/1981 | Fenoglio | 99/339 |
| 4,338,911 | 7/1982 | Smith | 126/21 |
| 4,377,109 | 3/1983 | Brown et al. | 99/401 |
| 4,462,383 | 7/1984 | Henke et al. | 126/21 |
| 4,471,750 | 9/1984 | Burtea | 126/21 A |
| 4,474,498 | 10/1984 | Smith | 432/144 |
| 4,506,652 | 3/1985 | Baker et al. | 126/21 A |
| 4,520,575 | 6/1985 | Holmes et al. | 34/23 |
| 4,556,043 | 12/1985 | Bratton | 126/21 A |
| 4,556,046 | 12/1985 | Riffel et al. | 126/299 D |
| 4,576,090 | 3/1986 | Burtea | 99/443 |
| 4,626,661 | 12/1986 | Henke | 219/400 |
| 4,632,836 | 12/1986 | Abbott et al. | 426/302 |
| 4,643,163 | 2/1987 | Martinez | 126/41 A |
| 4,643,167 | 2/1987 | Brewer | 126/299 |
| 4,660,467 | 4/1987 | Waks | 99/443 R |
| 4,679,542 | 7/1987 | Smith et al. | 126/21 A |

FOREIGN PATENT DOCUMENTS

2657744 6/1978 Fed. Rep. of Germany ........ 99/339

Primary Examiner—Timothy F. Simone
Attorney, Agent, or Firm—Willian Brinks Olds Hofer Gilson & Lione

[57] ABSTRACT

The present invention is a compact pizza oven which includes a baking chamber and a means for heating air. A fan means is provided for impelling the heated air through a top and bottom orifice toward the pizza. The oven also includes an oven door for closing and opening the baking chamber and a turntable upon which the pizza is rotated about its center while it is baked.

20 Claims, 13 Drawing Sheets

COMPACT PIZZA OVEN

BACKGROUND OF THE INVENTION

The present invention relates to the field of ovens for preparing food. More particularly, the invention relates to the field of ovens for baking pizza.

Historically, pizzas have been baked in deck ovens for a time sufficient to bake the crust and to bake, heat, and/or melt the ingredients atop the crust. Typically, the required bake times would be between 15 and 25 minutes per pizza.

One improvement to the art of baking pizzas has been the development of the conveyor oven. Through the use of conveyor ovens, it has been possible to improve the consistency of baking, ease of operation and utilization of available floor space. Thus, conveyor ovens have become the industry standard for high volume pizza restaurants and pizza delivery systems.

Another improvement has been the development of impingement ovens for baking pizza. These ovens, which are a special type of forced convection oven using columnated heated air to impact the pizza, have increased heat transfer capabilities and therefore have reduced the bake time significantly. One example of such an impingement oven is described in U.S. Pat. No. 4,679,542 to Don Paul Smith.

These impingement ovens have achieved wide acceptance among pizza restaurants, and pizza delivery systems, especially those which deal with high volume and/or fast service. The typical bake time for the commercially available impingement ovens is in the range of 5 to 9 minutes.

U.S. Pat. No. 4,632,836, to Abbott et al. and assigned to the same assignee as the present application, describes a pizza preparation and delivery system which is designed to deliver restaurant quality pizzas to the consumer's home or place of business. The entire disclosure of this '836 patent is incorporated herein by reference. The system described in this patent includes vehicles which were not only adapted to deliver the pizza, but also adapted to assemble and bake the pizza while in transit. Each vehicle in this system was equipped with a refrigerated case for storing pizza shells, a preparation station with pizza toppings to create an assembled pizza, and a conveyor oven for baking the assembled pizza.

The vehicles used in the preferred embodiment described in the '836 patent were modified FORD E-350 trucks with a van type body mounted thereon. Each vehicle included a driver's station and a kitchen area. A cook's chair was put in the kitchen area and the vehicle was laid out so that, while seated in the cook's chair, the cook could reach the pizza assembly station, the oven, and the cutting table. A door was provided in the side of the van for the cook to exit the vehicle and deliver the pizza to the door of the customer. Preferably, the vehicle of the '836 patent would be manned by a driver and a cook so that the driver could drive and the cook could remain in the cook's chair to assemble, cook, box and cut pizzas. Naturally, when the vehicle of the '836 was manned by a single worker, the driver would have to find a place to park the vehicle while he moved back to the kitchen area to prepare pizzas to be cooked. Also, the lone operator would have to park in order to remove the cooked pizza from the oven.

U.S. Pat. No. 4,556,046, to Riffel et al. and also assigned to the assignee of the present invention, described an improved ventilation system for a pizza preparation and delivery vehicle such as that described in the '836 patent. The entire disclosure of the '046 patent is also incorporated herein by reference.

Although the pizza preparation and delivery system described in the '836 and '046 patents enjoyed a measure of success, it was found that the purchase, operating, and maintenance costs of the relatively large vehicles used in the preferred embodiment ran higher than what was desirable.

One factor adding to these costs was the gasoline or propane electric power generator which was included on the vehicles to supply the power needs of the refrigerated cases and ovens on the vehicles. Not only did this generator add to the purchase, operating, and maintenance costs of the vehicle, it also increased vehicle noise.

U.S. Pat. No. 4,643,167, to Brewer and also assigned to the assignee of the present invention, described a further improvement to the ventilation system for an oven within a pizza preparation and delivery vehicle. By the time the application for the '167 patent was filed, the preferred vehicle had been downsized to a typical full-size van, such as the FORD "Econoline". The kitchen layout was the same in the '167 patent as in the '836 and '046. That is, the new vehicle included a driver's station and a kitchen area with a cook's chair and a conveyor oven. The new vehicle also included a separate electrical generator.

Although using this smaller van resulted in a reduction of the purchase, operating, and maintenance costs, market pressures still motivated the search for a vehicle that would be less expensive to purchase, operate and maintain. In particular, it is critical to minimize the costs of this new mobile preparation and delivery system so that an operator can offer pizza at the competitive prices, while achieving the same or higher profit levels as one could achieve in a conventional pizza restaurant or delivery business.

Co-pending U.S. patent application Ser. No. 07/258,969 (Attorney Docket No. 106-060) describes a compact pizza preparation and delivery vehicle which has solved some of the problems mentioned above. In particular, a vehicle which is less costly to purchase, operate, and maintain is described therein. One feature of the described embodiment is that the overall vehicle is much smaller in size. Another feature is that the vehicle does not require a separate generator to supply electrical power to the equipment on the vehicle.

One of the challenges in the development of the described vehicle was that of providing a pizza oven that would be small enough, light enough, and have a low enough electrical power demand to meet the specifications dictated by this new compact vehicle.

SUMMARY OF THE INVENTION

Briefly stated, the present invention is a compact pizza oven which includes a baking chamber and a means for heating air. A fan means is provided for impelling the heated air through a top and bottom orifice toward the pizza. The oven also includes an oven door for closing and opening the baking chamber and a turntable upon which the pizza is rotated about its center while it is baked.

In accordance with the preferred embodiment, the oven door is hinged on one vertical side and the turntable is connected to the door so that the pizza is brought out of the when the door is opened. Also, the preferred oven includes an actuator for opening and closing the oven door. Preferably, this actuator is connected to an oven controller which includes a timer for the baking cycle and means for generating a signal to the door actuator so that the door is automatically opened at the end of the baking cycle. In addition, the top and bottom orifices are preferably in the form of slots which extend across the diameter. Also, the oven of the preferred embodiment is actually a dual oven, i.e. with two baking chambers, turntables, etc.

The oven of the present invention provides significant advantages. For one thing, the preferred embodiment fits within a relatively small space and has a relatively low weight. In addition, the electrical power demands are relatively low.

It is noted that the term "pizza" as used in this specification and the appended claims is intended to have a relatively broad definition including traditional styles of pizza with a single crust topped with sauce, cheese, meats and/or vegetables, as well as other styles such as stuffed pizza.

The present invention, together with attendant objects and advantages, will be best understood with reference to the detailed description below read in conjunction with the accompanying drawings.

DETAILED DESCRIPTION OF THE PREFERRED EMBODIMENTS

Figure 1:
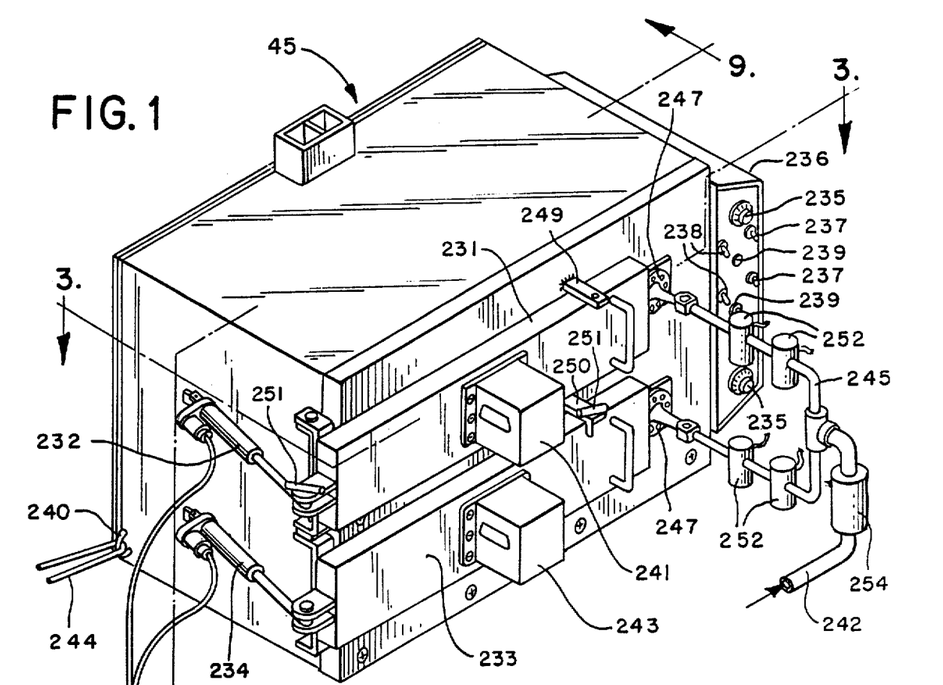
FIG. 1 is a perspective view of the front and side of the double oven of the most preferred embodiment.

Referring to the drawings, FIG. 23 is a perspective view showing the front and top of the preferred oven 45. As can be seen, the oven 45 is a dual oven, i.e. includes a top and a bottom oven unit. When used in a vehicle, such as that shown in FIG. 13, the dual oven 45 should be mounted to the frame member supports 199 with shock mounts decrease the road vibration transmitted to to the oven.

As shown, the top and bottom oven unit each have a door 231 and 233 respectively. These doors are preferably operated by actuators 232 and 234 respectively. Mounted on each of the doors is a motor housing 241 and 243.

In the event of door actuator or oven controller failure, the actuator pivot pin 251 can be removed from its location on the actuator and the door then opened. The same pin 251 can then be inserted into the hole 250 above the oven door to hold the door closed during the baking cycle.

On the left side of the oven is a control panel 236. Preferably, the controls are mounted to the side of the oven with rubber grommets and so that a gap is left between the two. In this way, the controls are subjected to less vibration and heat from the oven. The controls include toggle switches 237 for each of the blower motors and toggle switches 238 for each of the burners. A temperature control dial 235 and a "burner on" indicator light 239 are also included for each oven unit.

Gas line 242 bring gas from the fuel tank and through a filter 254. The line is then split into lines 245 which pass through the 2 solenoid operated valves 252 on each line. As mentioned above, the valves 252 are designed to be mechanically closed when not receiving a 12 volt signal.

A tie-down loop 240 is attached at the rear of the oven and a cable 242 is attached to the frame of the pickup to thus restrain the oven from moving forward in the event of a crash.

Figure 2:
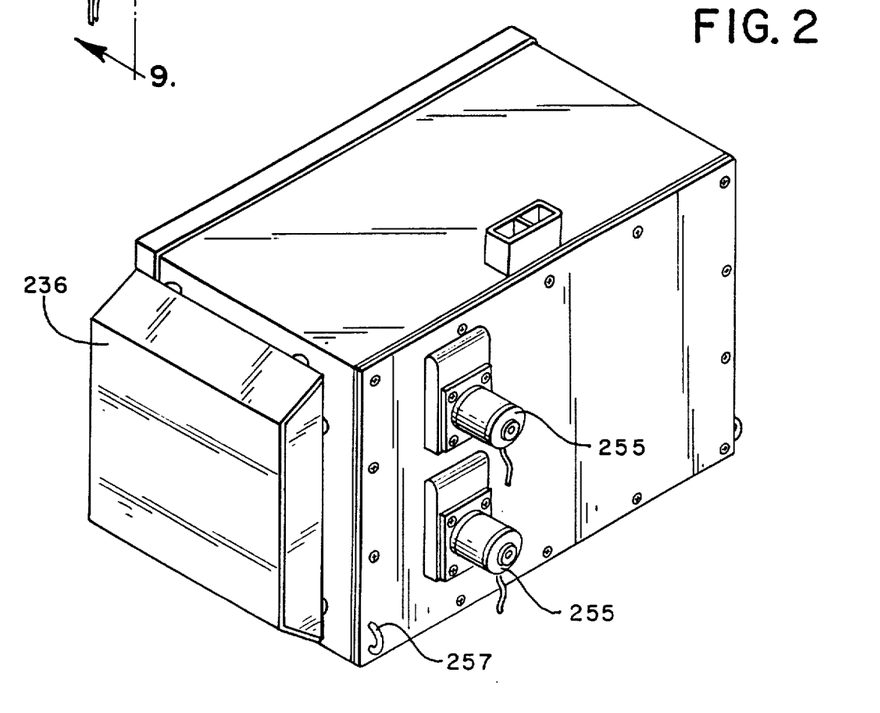
FIG. 2 is a perspective view of the rear and side of the oven shown in FIG. 1.

FIG. 2 is a perspective view showing the back of the preferred oven 45. As can be seen, the blower motors 255 project from the rear of the oven. Another tie-down loop 257 is included on the rear of the oven.

Figure 3:
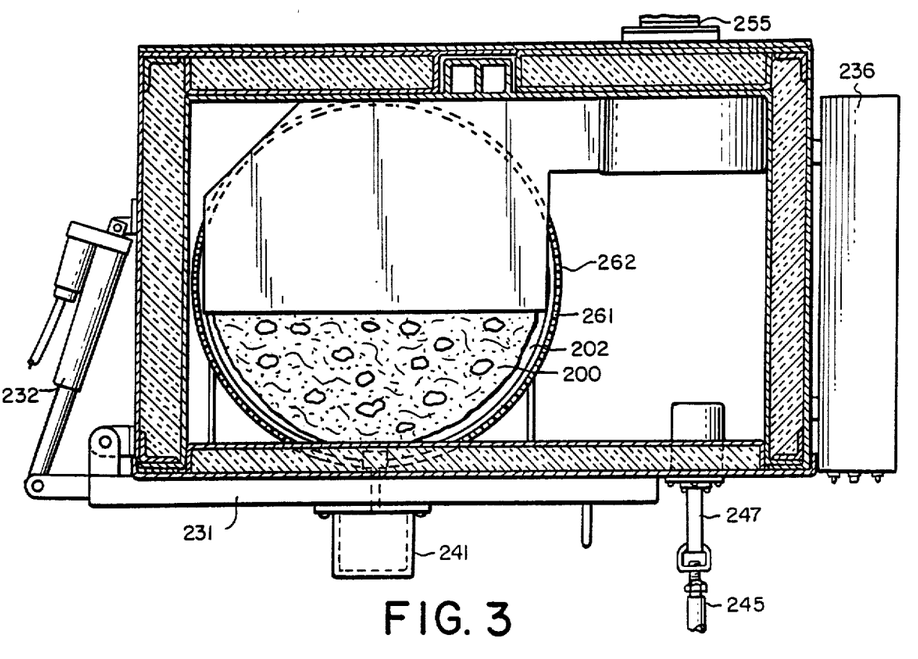
FIG. 3 is a cross-sectional view taken along line 3—3 of FIG. 1.
Figure 4:
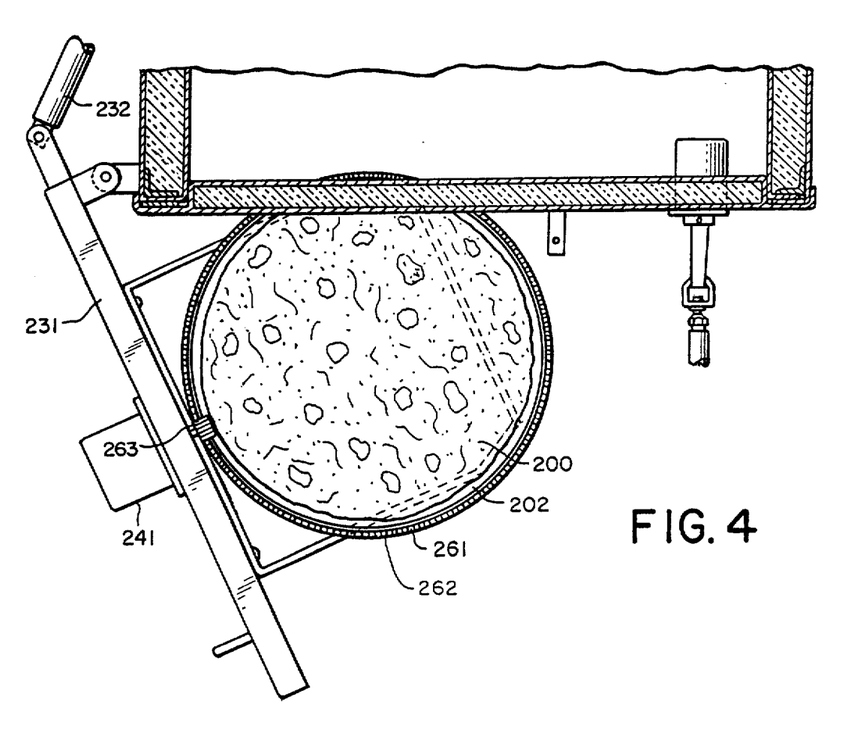
FIG. 4 is a view similar to FIG. 3 which shows the oven door open.
Figure 5:
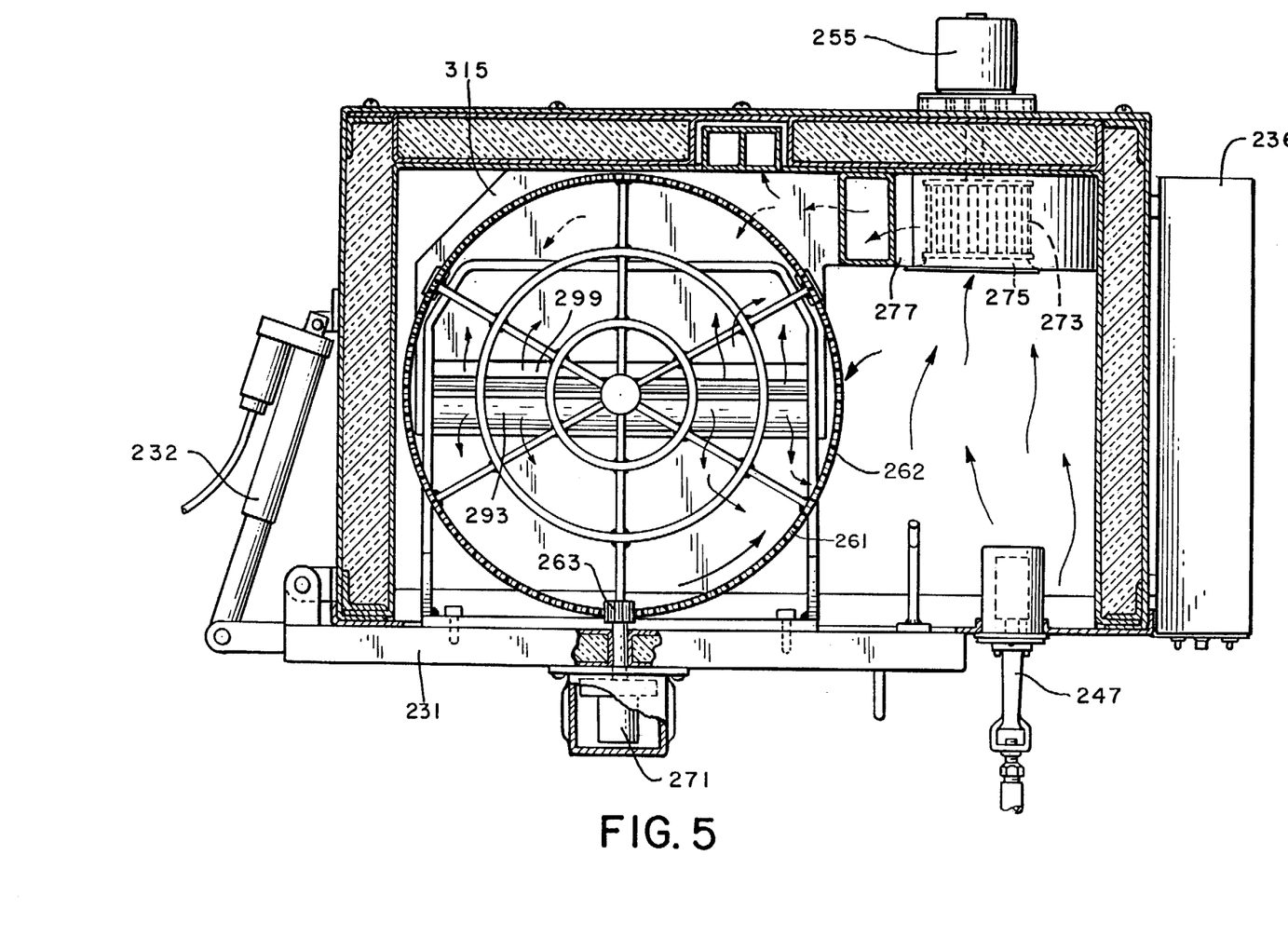
FIG. 5 is view similar to FIG. 3 showing the flow of air through the oven.
Figure 6:
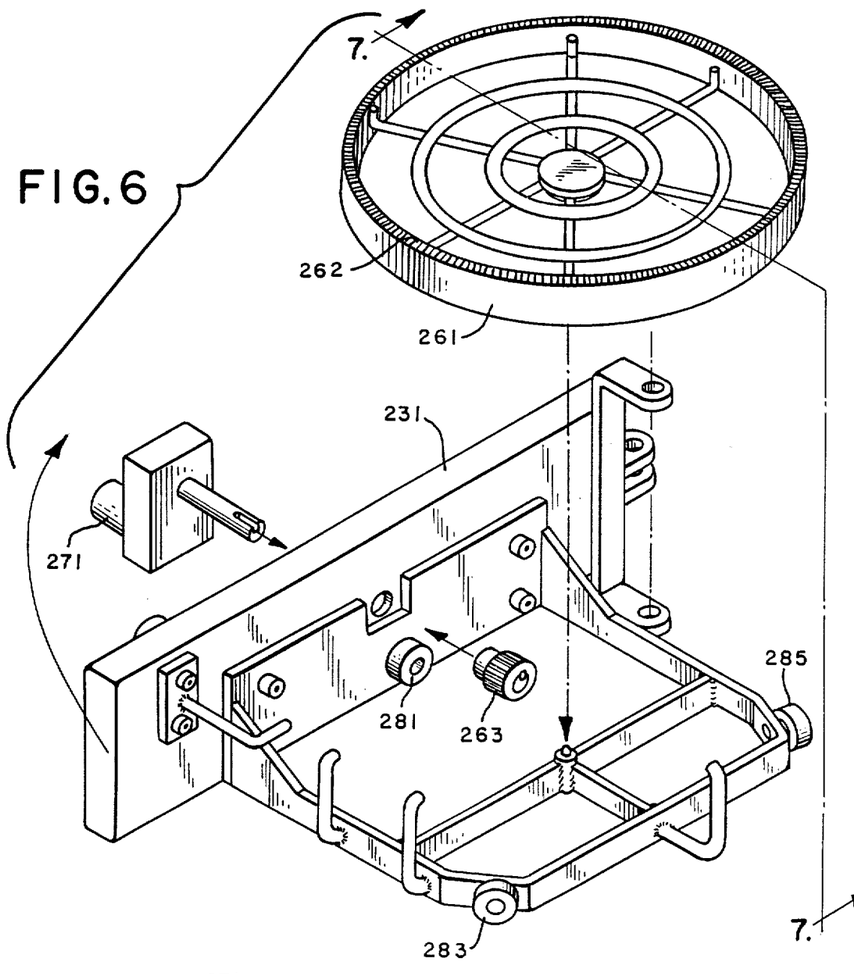
FIG. 6 is an exploded view of the oven door, the turntable and turntable motor for the oven of FIG. 1.
Figure 7:
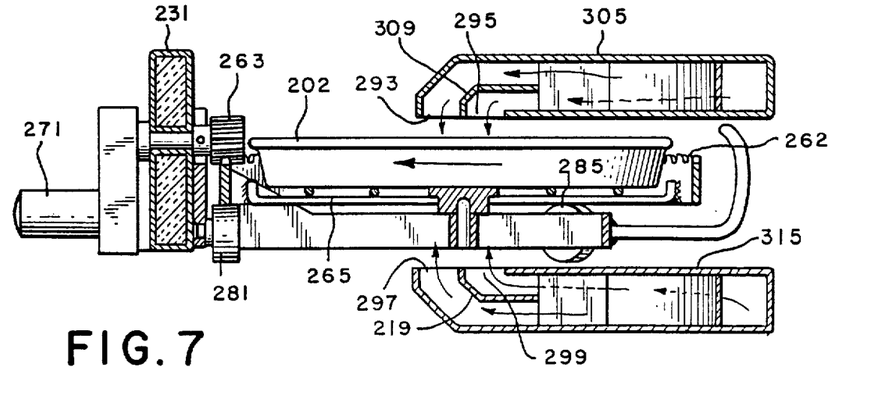
FIG. 7 is a cross-sectional view.

FIG. 3 is a cross-sectional view from the top of the oven through line 3—3 of FIG. 1. FIG. 4 is a similar view but with the door 231 swung open. Referring also to FIGS. 5 and 6, it is seen that a turntable 261 is attached to the door 231 so that the turntable is brought out of the oven chamber when the door 231 is opened. This turntable 261 is adapted to support the pizza 200 in the pan 202 during baking.

The turntable is adapted to rotate the pizza 200 during the baking cycle. This is preferably accomplished by means of an outer ring 262 which includes gear teeth to engage the driven gear 263. The gear 263 is driven by the motor 271. The underside of the outer ring 262 is adapted to roll on top of the wheels 281, 283 and 285. These wheels are preferably made of "rulon" so as to withstand the intense heat generated within the oven chamber. The motor is preferably set at a speed so as to rotate the turntable twice a minute.

FIGS. 5 and 7-9 illustrate the flow of heated air through the oven 45. As shown in FIG. 5, air is heated by the gas burner 247. That heated air is drawn through the inlet cone 275 into the volute 277 by the blower wheel 273. Preferably, the blower wheel is rotated at a speed of between about 2200 and about 2300 rpm so as to create a high velocity.

Figure 8:
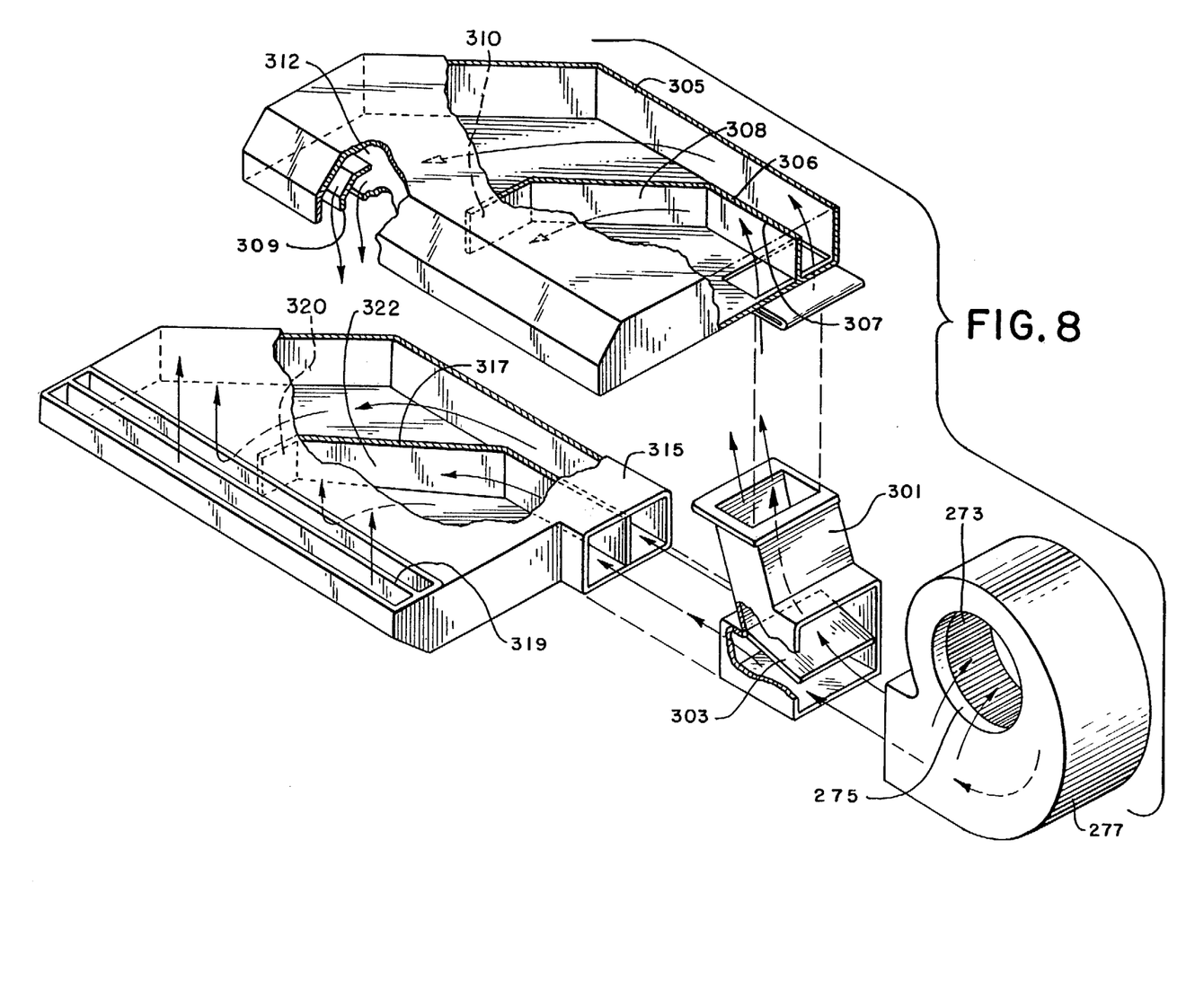
FIG. 8 is an exploded view showing the flow of air through the blower, ducts, and slots of the oven shown in FIG. 1.
Figure 9:
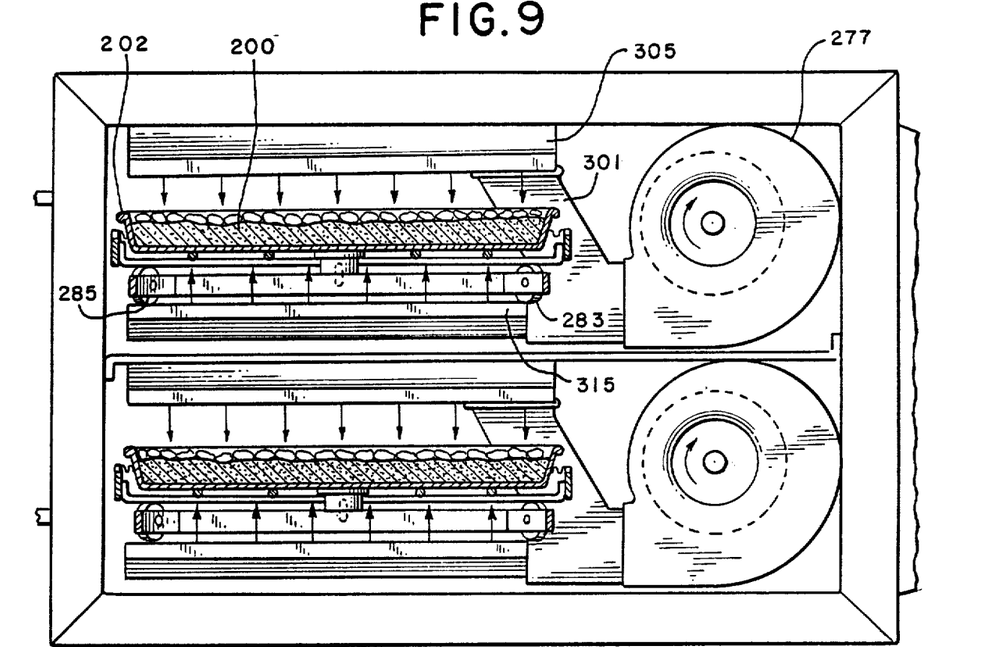
FIG. 9 is a cross-sectional view taken along line 9—9 of FIG. 1.

The air is impelled from the volute 277 into a air splitting plenum 301. Within the plenum 301 is a vane 303 which divides the air between the top and bottom plenums 305 and 315 respectively. The air that passes into the top plenum 305 is then divided by a tongue 307. The air passes out of the top plenum 305 through two slots 293 and 295 which are separated by a tongue 309. After passing through the slots 293 and 295, the air impinges on the top surface of the pizza 200. In similar fashion, the air that passes into the bottom plenum 315 is divided by a vane 317. The air passes out of the bottom plenum 315 through two slots 297 and 299 which are separated by a tongue 319.

Figure 10:
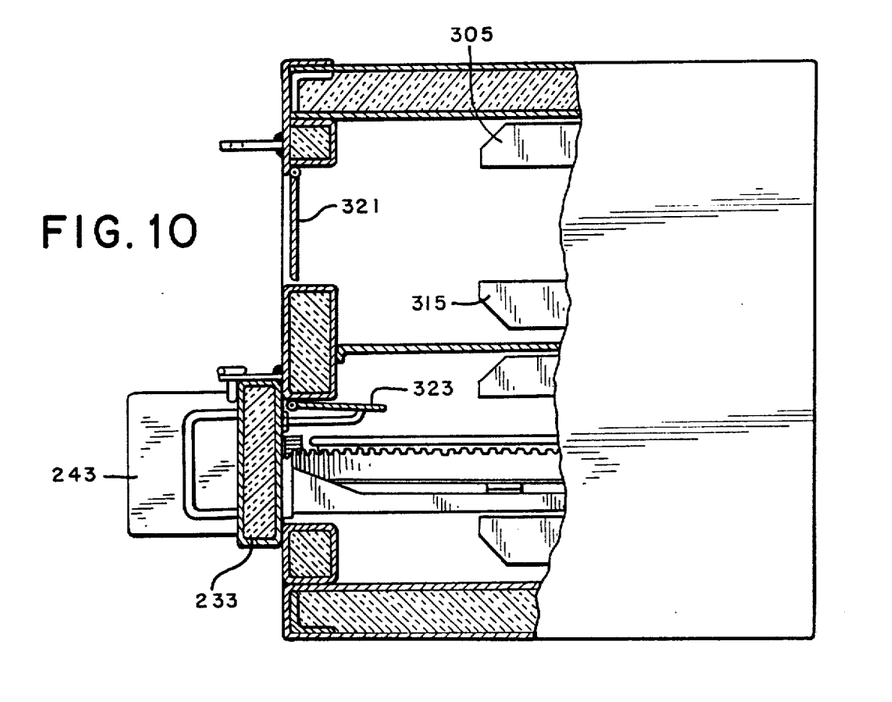
FIG. 10 is a partial cross-sectional view taken along line 10—10 of FIG. 1.

FIG. 10 illustrates an energy saving and air balancing feature of the preferred oven 45. In this figure, the top door is open and the turntable is out of the oven chamber. In this condition, a hinged plate 321 is allowed to swing down and block the opening to the oven chamber. As shown with the lower door 233, when the door is closed and the turntable pushed back into the oven chamber. the hinged plate 323 is pushed up and out of the way. In this way, the oven chamber is kept closed and the amount of secondary air to the burner flame is kept fairly constant.

Figure 11:
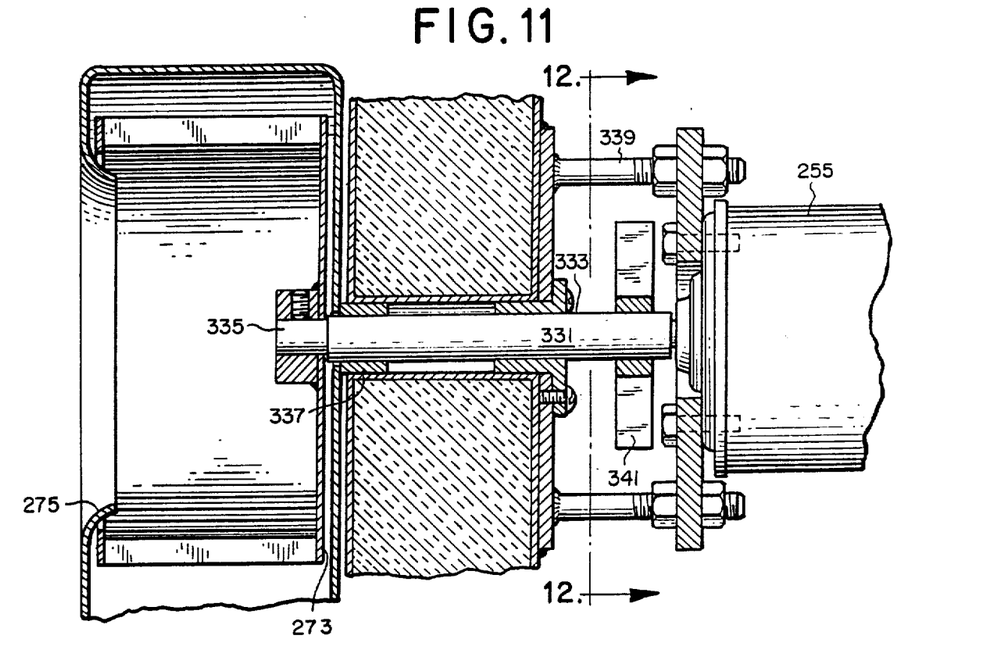
FIG. 11 is a cross-sectional view.
Figure 12:
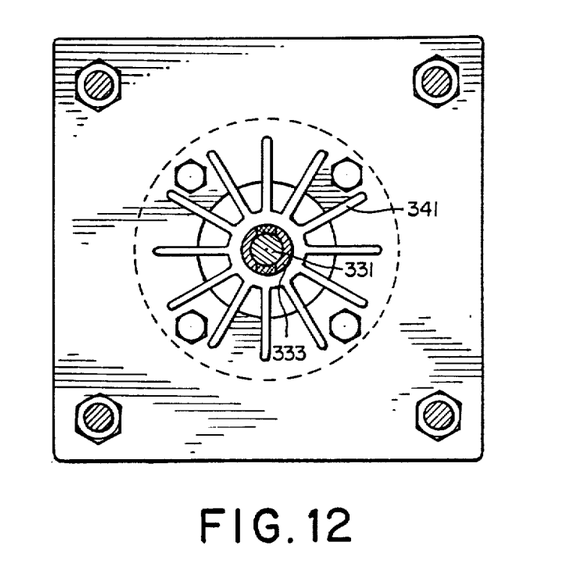
FIG. 12 is a cross-sectional view taken along line 12—12 of FIG. 11.

FIG. 11 is a cross-sectional view illustrating the configuration of the blower and motor shafts. In particular, the motor 255 is separated from the back of the oven by bolts 339. The motor shaft 331 is attached to the blower wheel hub 335. The shaft passing through a bushing 337. Attached to the extension shaft is a heat slinger 341 shown also in FIG. 34. The function of the heat slinger is to dissipate heat off of the shaft to avoid passing heat to the motor 255.

As mentioned above, one of the challenges of providing a compact pizza preparation and delivery vehicle such as that described in co-pending application No. 07/258,969 (Attorney Docket No. 106-060) was that of producing a suitable pizza oven. In particular, it was necessary to provide an oven which took up little space, required little electric power, and provided for optimum baking of the pizzas. The oven described herein is such an oven. The maximum power requirement, i.e. when both ovens are baking, is about 20 amps at 12 volts. The fact that the pizza is brought out of the oven when the oven door is opened is fortunate for two reasons. First, it allows for easier access for the driver. That is, the driver can simply place the pizza pan on the turntable rather than trying to slide the pan through an oven door. Second, because the pizza is brought out of the oven when the door opens automatically, the pizza cannot be overbaked because the driver is busy in traffic or away from the vehicle making a delivery at the completion of the baking cycle.

It was also a challenge to provide a small oven which could provide uniformly baked pizzas as well as consistency between pizzas. It was somewhat surprising that the slots such as used in the preferred embodiment would provide uniformly cooked pizzas. In particular, because the slots pass over the center of a rotating pizza, it was thought that the center of the pizza would be overbaked. That is, it was thought that since the center section of the pizza spends more time over the slots, it would be overbaked in the time it would take to bake the outer sections of the pizza. In experimentation, it was found that pizzas baked in an oven similar to that depicted—except that the vanes 307 and 317 were in the center of the top plenum and bottom plenums did show overbrowning on the top layer of cheese. However, it was found that pizzas cooked in this same oven were baked uniformly on the bottom.

It is currently believed that this uniformity of bottom baking is related to the fact that the center section of the pizza is the hardest section to get fully baked. This is because the center of the pizza is surrounded by the rest of the pizza and is further from the side of the heat conducting pizza pan. As a result, the center is the last section to be fully heated. This is why the center sections of pizzas cooked in conventional ovens are typically checked for doneness. Apparently, the oven of the preferred embodiment accomplishes a desirable balance between the center section spending more time under the slots and the center section being more difficult to bake. Whatever the reasons, it is fortunate that the oven provided for uniform bottom cooking in such a small space.

In connection with the overbrowning noted with respect to the top layer of cheese, it was found that this could be corrected through the use of a vane such as the one shown at 307. As can be seen, the leading portion 306 of the vane 307 splits the air column as it enters the top plenum 305. The vane then makes a 45° turn to the second portion of the vane 308, followed by another 45° turn to the third portion of the vane 310. This third portion of the vane 310 is located on the volute side of the center of the slot. In particular, this portion 310 is preferably 1.0" off of center. This bending of the air column in front of the vane, coupled with the fact that the air behind the third portion 310 of the vane does not bend as dramatically, produces an area 312 of reduced air pressure, i.e. a "shadow", behind the third portion 310. This reduced air pressure has been found to compensate for the greater amount of time the center section of the top cheese layer spends under column of heated air. As a result, pizzas cooked in the depicted oven, i.e. with the vane 307, have not shown overbrowning at the center section.

As seen in FIG. 8, the bottom plenum also includes a vane 317. In this case, the vane 317 is used to create an area 322 of increased air pressure under the center of the pizza pan. In particular, the third portion 320 of the vane 317 has been located at the center of the slot. As a result, higher air pressure is created in the area 322. This has been found to be preferable so that even more heat can be directed toward the bottom center of the pizza during cooking.

Figure 13:
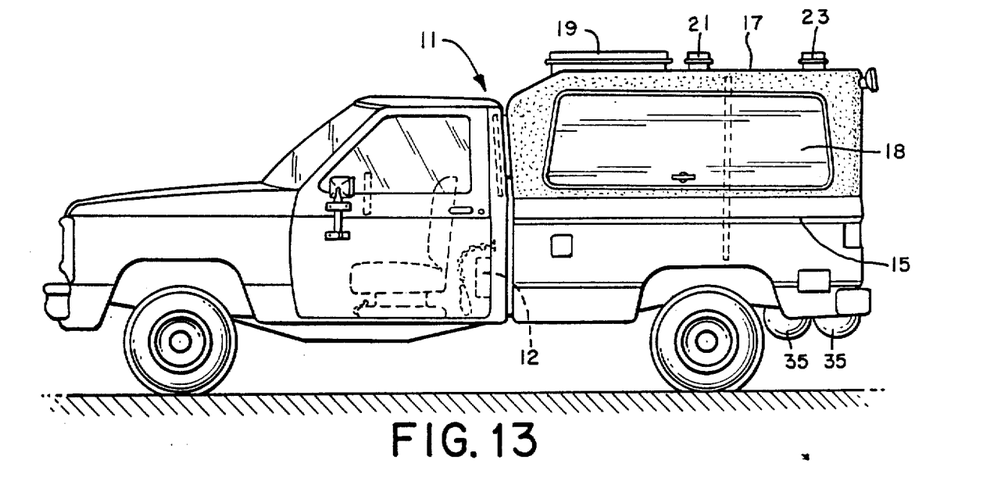
FIG. 13 is a driver's side view of the vehicle in which the most preferred embodiment of the present invention can be deployed.

Referring to FIG. 13, a vehicle is shown which is the preferred vehicle to deploy the oven of the present invention. This figure is a view from the driver's side of the pizza preparation and delivery vehicle 11 described as the most preferred embodiment of the co-pending application. The vehicle 11 is a pickup truck which has been modified in the ways to be described below. The pickup truck shown is a FORD Ranger model "Regular Cab 2-wheel drive". This particular truck is generally considered a "mini-pickup" as opposed to a midsize or fullsize. This pickup truck has a payload capacity of approximately 1612 pounds and a Gross Vehicle Weight Restriction (GVWR) of 4260 pounds. The cargo bed of this truck is approximately 77" long and 54" wide. The engine is a 2.3 liter 4 cylinder.

This particular truck's relatively small size makes it economical to purchase, operate and maintain. The purchase price of this mini-pickup is considerably lower than that of the larger vehicles described in the three patents mentioned above. The purchase price is a particularly important factor to the feasibility of establishing a fleet of such pizza preparation and delivery vehicles.

Also, because of its small size, the mini-pickup is more economical to run. The E.P.A. quoted gas mileage figures for this truck are 22 m.p.g. in the city and 27 m.p.g. on the highway. This can be compared to the E.P.A. quoted figures of 15 m.p.g. in the city and 17 m.p.g. on the highway for the full-size van used in the '167 patent. This better gas mileage is important because it lowers the average cost per pizza of operating the vehicle.

The operating cost of the vehicle of the present invention is also reduced by virtue of the fact that it is operated by a single person sitting in a single location. The driver sitting in the driver's seat is able to prepare and bake pizzas.

The cost of equipping, operating and maintaining the preferred vehicle is reduced by virtue of the fact that there is no separate generator to provide electrical power for the equipment on the vehicle. The vehicles described in the three patents noted above required a separate gas operated electrical generator. Naturally, this added to the costs and noisiness of the vehicle.

In the preferred vehicle the oven is heated by gas. The electrical power needed for the oven, the refrigerated cases, the additional lights, as well as the ventilation, control, safety, and communications systems is supplied by the alternator of the pickup truck. In order to insure enough current, it is most preferred to replace the original alternator that comes with the FORD Ranger with a heavy duty alternator such as that sold by LESTEK MFG. under the designation #9135 P.F. This alternator is rated at 135 amps.

Another advantage of using the compact mini-pickup truck in the preferred embodiment is that it is typically easier to maneuver, e.g. back up and park, a mini-pickup than it is a full-size van. This is important because the driver will likely have to park in confined spaces when making deliveries. Experience with the vehicles of the preferred embodiment has shown that these vehicles have had fewer accidents per mile than the full-size vans shown in the '167 Brewer patent.

Figure 14:
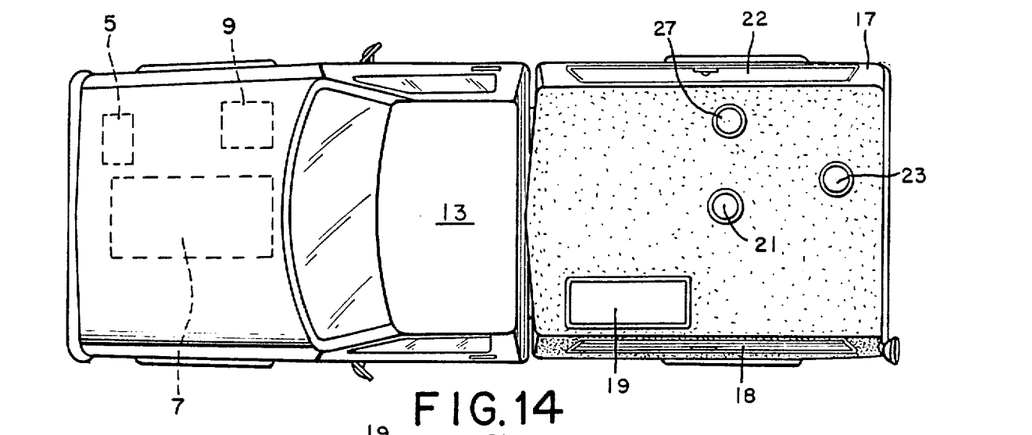
FIG. 14 is a top view of the vehicle shown in FIG. 13.
Figure 15:
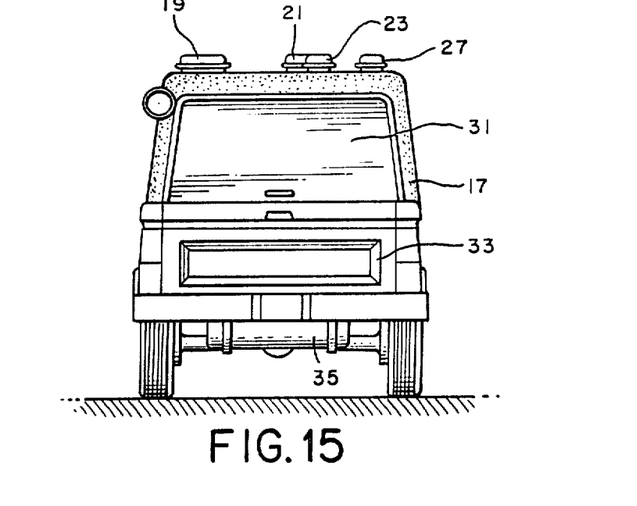
FIG. 15 is a rear view of the vehicle shown in FIG. 13.

Referring to FIGS. 13–15, the vehicle 11 includes a driver's compartment or cab 13. The vehicle also includes a cargo bed 15 with a tailgate 33. A topper 17 is mounted over the cargo bed 15 to create a cargo compartment. With the exceptions noted below, the topper 17 is an otherwise conventional topper for pickup trucks. The particular topper shown was obtained from GUIDON CO. under the designation "RENEGADE II".

The topper 17 includes four doors hinged at the top and securely latched at the bottom. Door 18 is on the driver's side of the topper and provides access to the oven. Door 22 is on the passenger side of the topper and also provides access to the oven. Door 31 is at the rear of the topper and provides access to the supplemental refrigerated case.

The topper 17 also includes four ventilation ports. Port 19 is a conventional wind driven port such as that found on recreational vehicles and operates to pull air from the cargo compartment when the vehicle is in forward motion. Port 27 is driven by an electric fan. Port 21 covers the flue of the pizza oven. Port 23 allows air to be vented from the rear compartment. A positive air pressure is created in the rear compartment by the fan 142 located in the cargo bed (See FIG. 20).

Fuel tanks 35 are located underneath and near the rear of the cargo bed 15.

Figure 16:
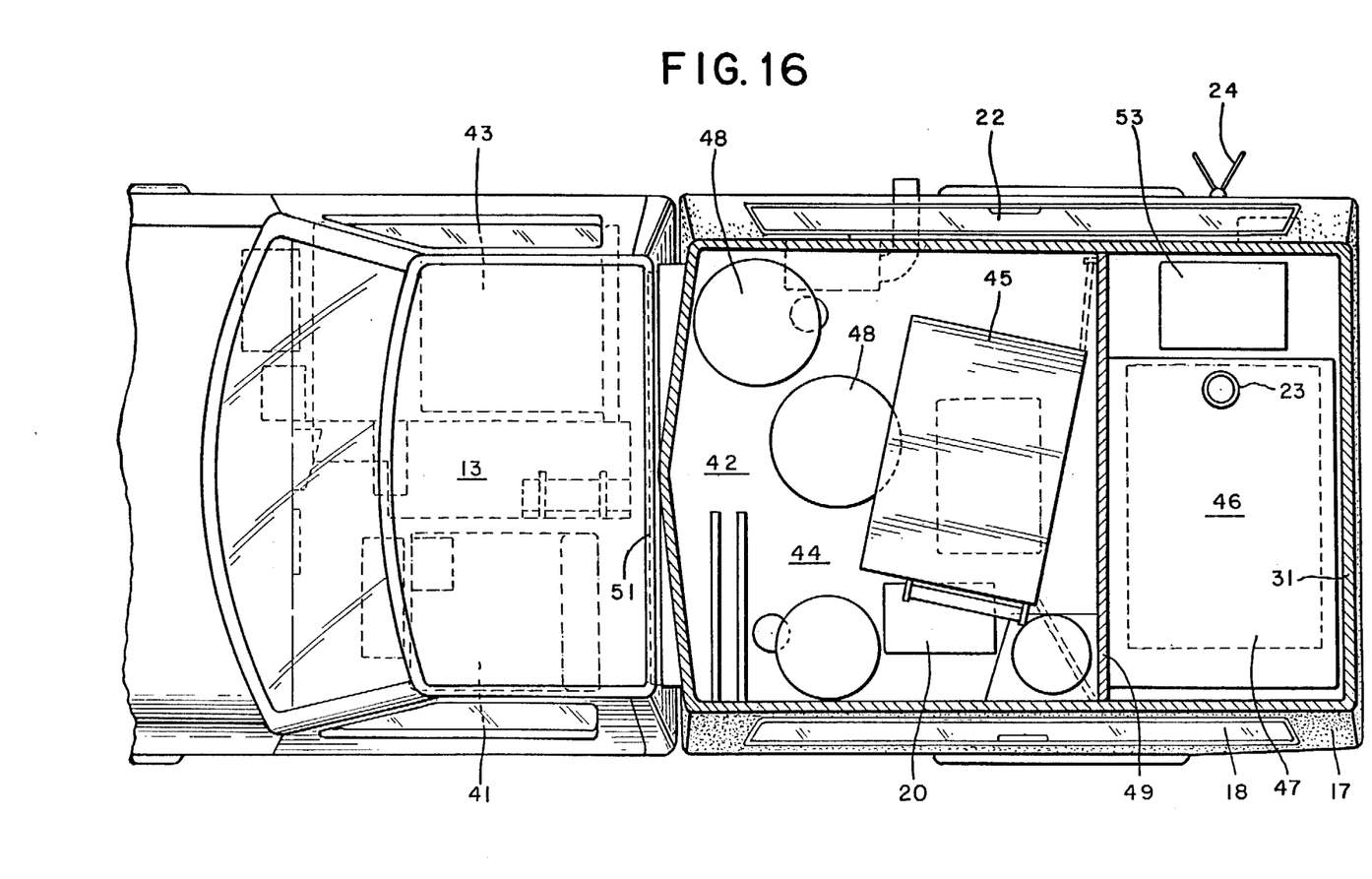
FIG. 16 is top view showing the layout of the various elements of the vehicle shown in FIG. 13.

FIG. 16 is a cross-sectional view intended to show the most preferred lay-out of the equipment in the vehicle 11. The cab of the pickup truck is designated as the driver's compartment 13. Within the driver's compartment is the driver's seat 41. Also within the driver's compartment is a refrigerated case 43. The cargo compartment of the vehicle is separated from the driver's compartment by window 51. A dividing wall 49 serves to separate the cargo compartment into an oven compartment 44 and a refrigerated case compartment 46. Curb feelers 24 are preferably included.

Figure 18:
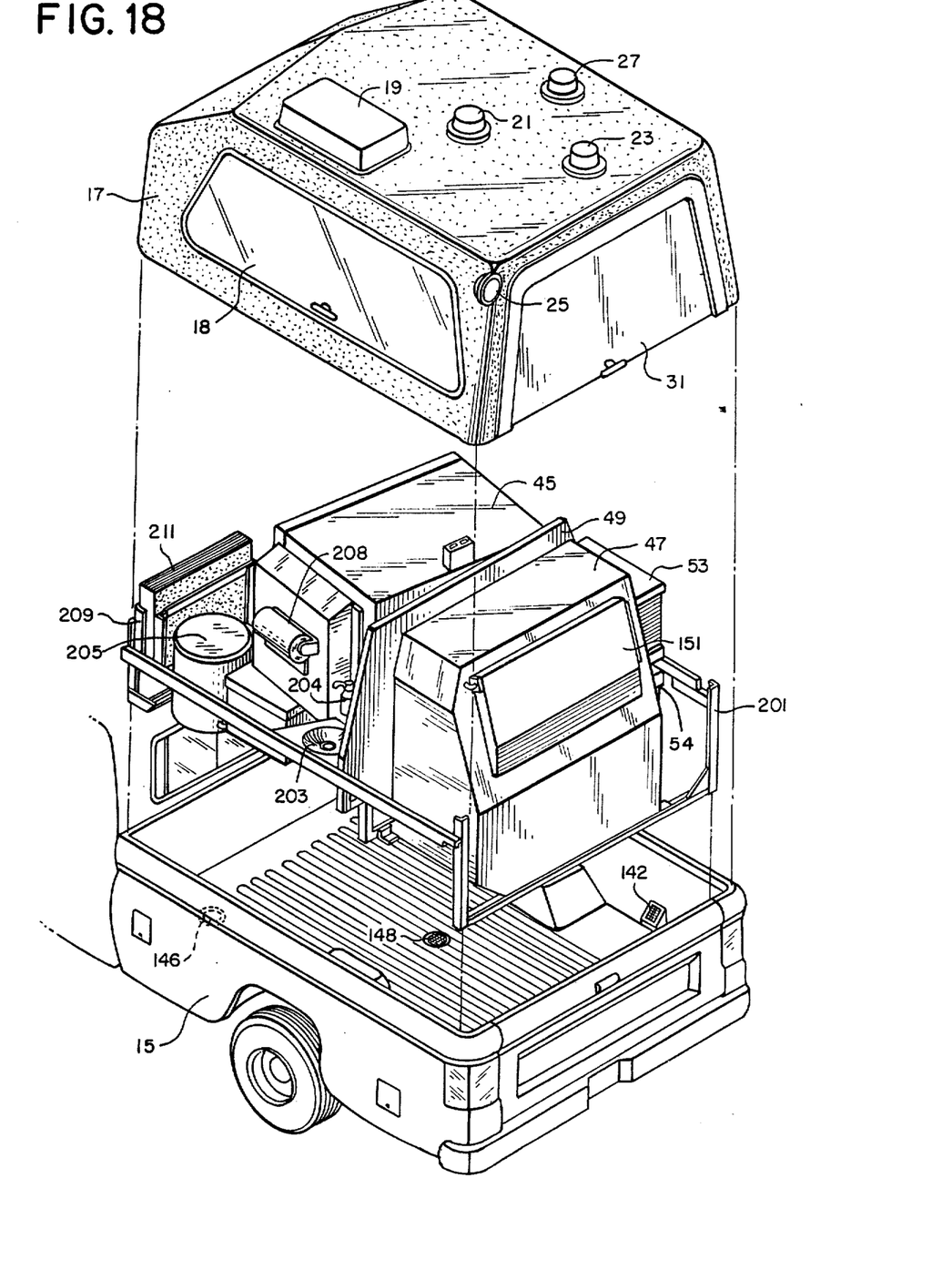
FIG. 18 is an exploded view showing the topper and the support frame with the oven and supplemental refrigerated case mounted thereon.

FIG. 21 shows the frame member 201 with the equipment mounted thereon and ready to be inserted and attached within the cargo bed 15. As can be seen, the supplemental refrigerated case 47 and the compressors are located behind the dividing wall 47. The oven 45 is mounted in front of the wall 49.

The pizza oven 45 of the most preferred embodiment is located in the oven compartment 44 and positioned so that the driver can insert an unbaked pizza and remove a baked pizza from the oven while sitting in the driver's seat.

A supplemental battery 20 is located in the cargo compartment. This battery is recharged by the alternator for the truck engine. It has been found preferable to use a supplemental battery to power the equipment in the vehicle rather than using the original battery for the engine. One reason for this is so that the starting of the vehicle is kept separate from the operation of the equipment on board. Most preferably, the supplemental battery is a 12 volt marine type, series 27 Exide Battery #5231.

A supplemental refrigerated case 47 is located at the rear of the cargo compartment and is thus accessible through the rear door 31 of the topper 17. Compressors 53 and 54 are also located at the rear of the cargo compartment. Preferably, the upper compressor 53 cools the supplemental refrigerated case 47, while the lower compressor 54 cools the refrigerated case in the driver's compartment 43 by means of coolant lines passing therebetween.

Figure 17:
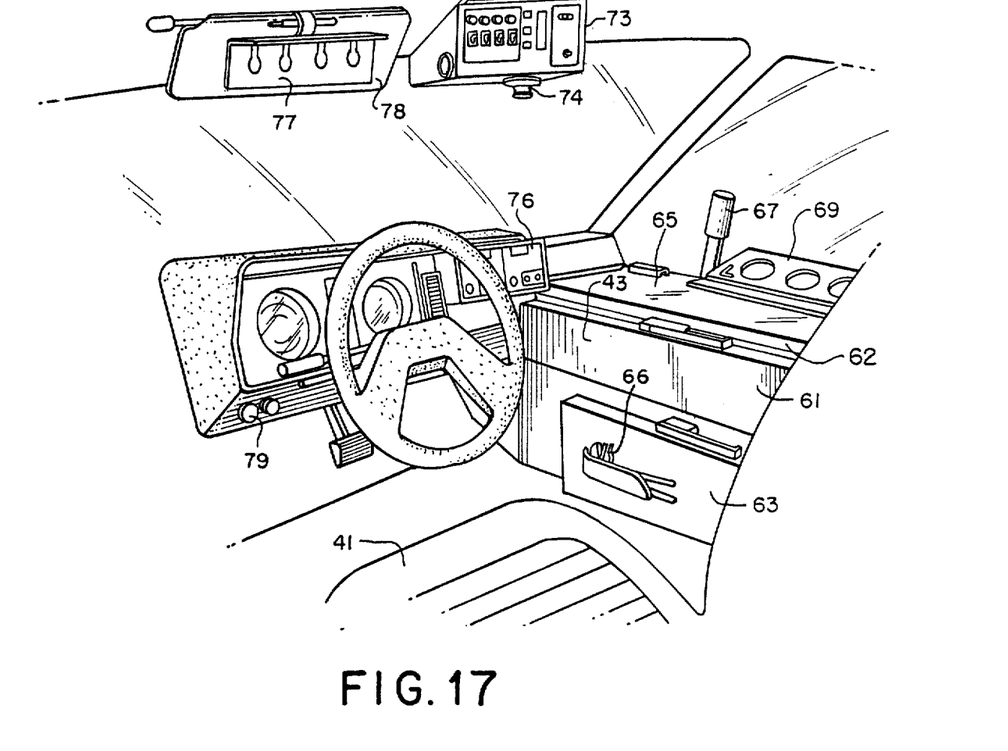
FIG. 17 is a perspective view of the interior of the driver's compartment.

FIG. 5 is a perspective view looking into the driver's compartment from the driver's door. As can be seen, the passenger's seat has been removed from the pickup truck and replaced by a refrigerated case 43. The top of the refrigerated case 43 is adapted to serve as a preparation table 65 on which the uncooked pizza shell is placed while the topping are put on. The table 65 also serves as the surface on which the baked pizza is cut and boxed.

An electrical systems control box 73 is installed on the ceiling of the cab. This box includes switches to control the lights and the other electrical systems of the vehicle, namely the interior lights, rear spot light, safety system, oven, refrigerated cases. A volt meter monitoring for the supplemental battery system is also included control box 73. In this way, the driver can monitor the status of the supplemental battery when the engine is turned off, and thus know to restart the engine to recharge the supplemental battery. A working light 74 is included on the bottom of the control box 73.

An oven control box 71 is mounted on the dash. This oven control box includes the switches to operate the pizza oven of the vehicle. Because the preferred pizza oven actually includes two stacked baking units, the preferred oven controller includes identical controls for the top and the bottom baking units.

The preferred oven controller means has several functions. The primary function is to serve as an oven timer. That is, the controller means sets the proper baking cycle for the oven. This is preferably accomplished by including an electronic timer which is set at the proper time when the pizza is inserted in the oven and then counts down to zero while the pizza is being baked. When the timer reaches zero, a signal is generated. Preferably, this signal will generate an audible signal to the driver as well as a lighted indicator that the baking cycle is completed.

As described above, the oven doors are equipped with actuators which can automatically open the oven doors and bring the baked pizza out of the oven. Thus, in this embodiment, at the conclusion of the preset baking cycle, the oven controller means will also generate a signal to the door actuator means so that the doors are opened and the pizza is removed.

This feature of automatically removing the pizza from the oven at the conclusion of the baking cycle is highly advantageous in that it prevents the pizza from becoming overcooked if the driver is unable to stop the vehicle, or if the driver is away from the vehicle making another delivery.

Another feature of the preferred oven controller means is that it is also adapted to conserve electrical energy. The preferred oven is an impingement oven wherein heated air is impelled by high-speed fans or blowers toward the top and bottom of the pizza. The oven controller means is programmed to step up the speed of the fans to the operating speeds at the beginning of the baking cycle. At the end of the baking cycle, the fan speed is reset to an energy saving idle speed. In addition, the oven uses a powered turntable to rotate the pizza during cooking. For the same reasons, the oven controller means will preferably switch the turntable on and off to coincide with the baking cycle.

Most preferably, the oven controller means is configured so that the driver simply pushes a "door open" button to begin the baking process. In response to pushing the initial button, the door actuator opens the door of oven. The driver then places the pizza, preferably in a pan, onto the turntable of the oven. A second button, "start bake" button is pushed. In response, the oven controller generates the signal to close the door, to step up the speed of the fans, to switch the turntable on, and to begin timing the baking cycle. Most preferably, the oven controller provides a visual readout, such as by LED, of the time remaining for each baking cycle. At the conclusion of the baking cycle, the controller means generates an audible signal, such as a beep for 30 seconds, and also generates the signal to the door actuator to open the oven door.

When the oven door opens, the driver can bring the pizza in the pan into the driver's compartment by use of the pan grippers 66. The hot pizza is removed from the pan and placed on the table 65 where it will be cut and boxed. The hot and dirty pan is then passed back through the window and dropped into the pan receiving areas 48 (see FIG. 16).

The most preferred driver's compartment includes a few other special features. Mounted on the visor 75 is a order holder 77 which can be used to retain the customer pizza orders until completed. Also, a special safety button 79 is included. As explained in connection with FIG. 19, this button acts as an emergency kill switch to shut off the flow of gas from the fuel tanks. According to the preferred safety system, none of the solenoid operated valves on the fuel tanks or ovens will open unless the switch is pulled out. Naturally, this switch should be well labeled and lighted.

Figure 19:
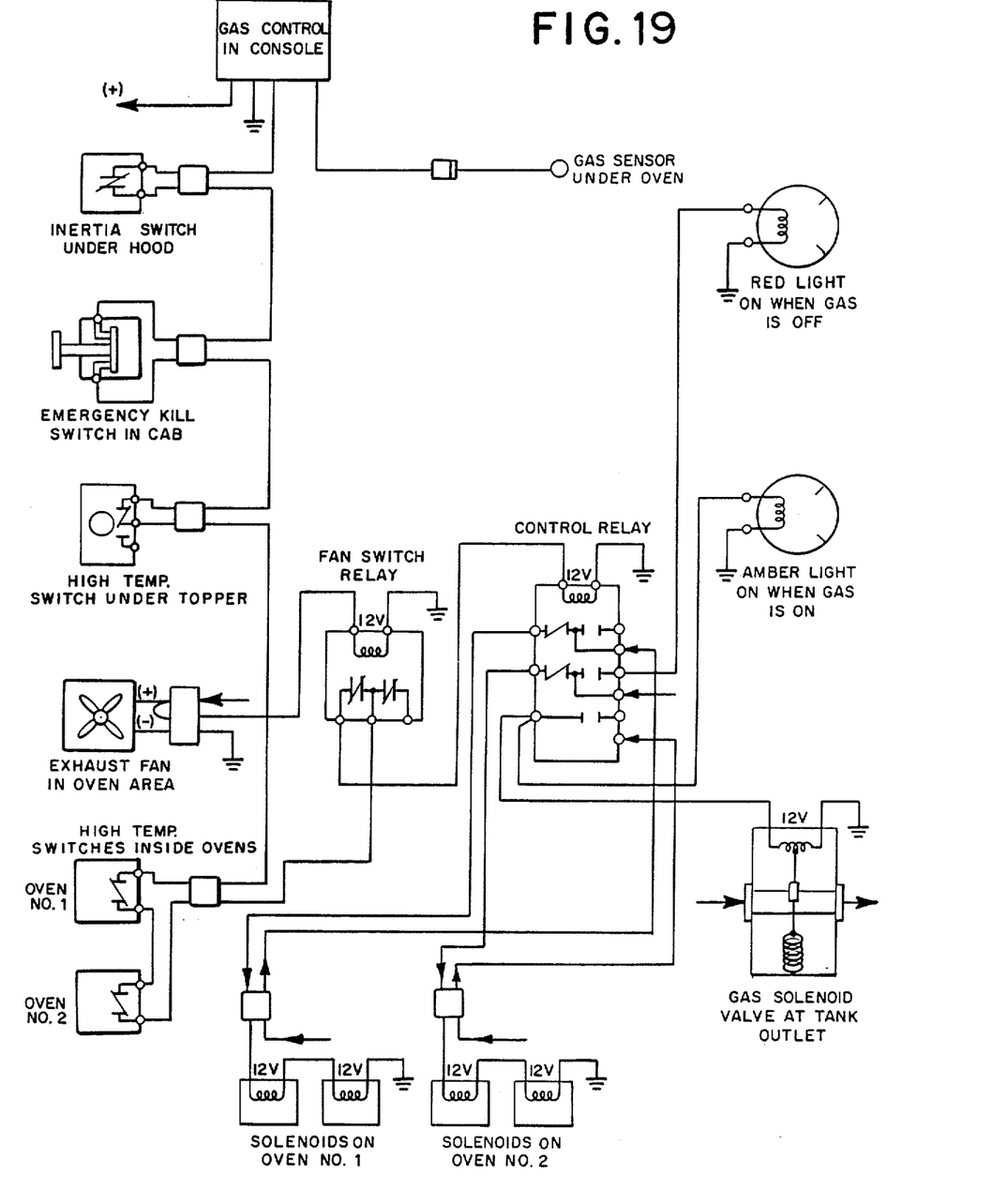
FIG. 19 is a schematic wiring diagram of the safety system for use with the oven shown in FIG. 1 as deployed in the vehicle shown in FIG. 13.

FIG. 19 is a schematic wiring diagram illustrating the preferred safety system for the vehicle. The inventions embodied in this safety system are described and claimed in a co-pending U.S. patent application Ser. No. 07/259,041 (attorney Docket No. 106-061) filed on the same day and assigned to the same assignee as the present application.

Starting at the bottom right side of the diagram, the system includes a solenoid operated valve at the outlet of the fuel tank. This valve is mechanically closed unless the solenoid is activated with 12 volts. Solenoid operated valves are also included for each of the two oven units. Like the valve at the fuel tank outlet, these valves are mechanically closed and opened only if the solenoids are activated with 12 volts. As a consequence, the gas is shut off from the outlet of the fuel tank, and the gas to the ovens is shut off, if the power circuit is opened by one of the following safety devices.

Moving now to the top of the diagram, the safety system includes a gas control unit in the console of the cab which is connected to a gas sensor located 2" above the floor of the cargo bed on the oven support leg nearest the burners for the oven. The gas control normally supplies 12 volts to the rest of the system when no gas is detected. If gas is detected, the control supplies 0 volts to the control relay and the valves at the outlet of the fuel tank and ovens are automatically, mechanically shut. Preferably, the gas sensor, control, and selenoid are purchased as a set from the Newtec Co. However, because the power output of the control is insufficient to power the remaining components of the safety system, a control relay is preferably added.

The system also includes an inertia switch under the hood of the pickup. This switch is designed to shut off the power in the event of sudden impact, i.e. a collision, or inverted position, i.e. rollover. As stated above, the valves at the fuel tank and ovens automatically close when the power is shut off anywhere in the system.

An emergency kill switch is provided for the driver on the dash of the vehicle. Preferably, this switch is clearly labeled, lighted, and must be pulled out before the oven can be operated.

A high temperature sensor is included on the underside of the topper in the oven compartment. Preferably, this sensor is set to open the circuit if the temperature inside the topper reaches about 250° F.

High temperature switches are also included within each of the two oven chambers. Preferably, these switches are set to open the main power circuit if the temperature in either oven chamber exceeds about 625° F., i.e. a preset temperature about 100° F. above the normal operating temperature of the oven.

An exhaust fan is included in the topper to exhaust the oven compartment through ventilation port 21 (see FIG. 14). The circuit is designed so that the fan always runs when the oven is on. If this fan loses power, the relay also closes the solenoids at the fuel tank and ovens.

Indicator lights are provided for the driver to see the status of the safety system. A red light is adapted to be turned on whenever the gas has been shut off. An amber light is adapted to be turned on whenever the gas is flowing.

It should be noted that although much of the discussion has involved the deployment of the preferred oven in a self-powered pizza preparation and delivery vehicle, such as a mini-pickup truck, other types of vehicles can also be used. For example, the oven can be used in trailers, carts or other types of vehicles. Also, because of its small size advantages, the oven will also find a wide variety of applications in other foodservice settings such as cafeterias. Certainly, these and all other modifications which are within the ordinary skill in the art to make are considered to lie within the scope of the invention as defined by the appended claims.

I claim:

1. A compact pizza oven comprising:
   a baking chamber;
   means for heating air;
   fan means for impelling heated air;
   an oven door;
   a turntable upon which a pizza is rotated about its center;
   at least one top orifice in the baking chamber through which heated air is impelled toward the top of the pizza as it is rotated on the turntable; and
   at least one bottom orifice in the baking chamber through which heated air is impelled toward the bottom of the pizza as it is rotated on the turntable.

2. The oven of claim 1 wherein the top orifice is a slot.

3. The oven of claim 1 wherein the bottom orifice is a slot.

4. The oven of claim 3 wherein the top orifice is a slot.

5. The oven of claim 1 wherein the top orifice is a slot with a length substantially equal to the diameter of the turntable and wherein the midpoint of the slot is generally above the center of the turntable.

6. The oven of claim 1 wherein the bottom orifice is a slot with a length substantially equal to the diameter of the turntable and wherein the midpoint of the slot is generally below the center of the turntable.

7. The oven of claim 6 wherein the top orifice is a slot with a length substantially equal to the diameter of the turntable and wherein the midpoint of the slot is generally above the center of the turntable.

8. The oven of claim 1 wherein the oven door is hinged on one vertical side and wherein the turntable is connected to the door whereby the turntable is brought out of the baking chamber when the door is swung open.

9. The oven of claim 8 wherein the turntable is powered by a motor located on the oven door.

10. The oven of claim 8 wherein the oven further comprises a closing plate hingedly attached above the oven door, which closing plate is adapted to swing down and close the baking chamber when the oven door is swung open and is adapted to be pushed open when the oven door is swung closed.

11. The oven of claim 1 further comprising oven controller means including a timer means for setting a proper baking cycle for each pizza.

12. The oven of claim 11 wherein the oven controller means further comprises energy saving means for switching the fan means from an idle speed to a faster baking speed at the beginning time of the baking cycle, and for switching the fan means back to the idle speed at the end of the baking cycle.

13. The oven of claim 12 wherein the energy saving means further includes means for switching the turntable on at the beginning of the baking cycle, and for switching the turntable off at the end of the baking cycle.

14. The oven of claim 11 wherein the pizza oven further comprises actuating means for automatically opening the oven door in response to a signal generated by the oven controlling means.

15. The oven of claim 1 wherein the pizza oven further comprises actuating means for automatically opening the oven door.

16. A compact pizza oven comprising:
    a first and second baking chamber;
    first and second means for heating air;
    first and second fan means for impelling heated air in the first and second baking chamber respectively;
    a first and second oven door;
    a first and second turntable upon which pizzas are rotated about their center;
    at least one top orifice in the first baking chamber through which heated air is impelled toward the top of the pizza as it is rotated on the first turntable;
    at least one bottom orifice in the first baking chamber through which heated air is impelled toward the bottom of the pizza as it is rotated on the first turntable
    at least one top orifice in the second baking chamber through which heated air is impelled toward the top of the pizza as it is rotated on the second turntable; and
    at least one bottom orifice in the second baking chamber through which heated air is impelled toward the bottom of the pizza as it is rotated on the second turntable.

17. The oven of claim 16 wherein the first baking chamber is located above the second baking chamber.

18. The oven of claim 16 wherein the first and second top orifices are slots each with a length substantially equal to the diameter of the first and second turntable respectively and wherein the midpoint of each slot is generally above the center of the first and second turntable respectively.

19. The oven of claim 16 wherein the first and second bottom orifices are slots each with a length substantially equal to the diameter of the first and second turntable respectively and wherein the midpoint of each slot is generally below the center of the first and second turntable respectively.

20. The oven of claim 19 wherein the first and second top orifices are slots each with a length substantially equal to the diameter of the first and second turntable respectively and wherein the midpoint of each slot is generally above the center of the first and second turntable respectively.

* * * * *